United States Patent [19]

Nenkov et al.

[11] Patent Number: 4,776,436

[45] Date of Patent: Oct. 11, 1988

[54] FACE SHOCK ABSORBER

[75] Inventors: Nikolay D. Nenkov; Dimo S. Yordanov; Peter V. Nedyalkov; Botko P. Ivanov, all of Sofia, Bulgaria

[73] Assignee: Geologoproutshvatelno Predpriyatie, Sofia, Bulgaria

[21] Appl. No.: 51,091

[22] Filed: May 14, 1987

[51] Int. Cl.4 ............................................. F16F 9/30
[52] U.S. Cl. .................................... 188/268; 175/321
[58] Field of Search ................. 188/268, 378; 175/321

[56] References Cited

U.S. PATENT DOCUMENTS

| 3,417,660 | 12/1968 | Harbrecht | 188/268 |
| 3,606,297 | 9/1971 | Webb | 175/321 |
| 4,173,130 | 11/1979 | Sutliff et al. | 175/321 |

FOREIGN PATENT DOCUMENTS

| 44909 | 2/1928 | Norway | 188/268 |
| 697683 | 11/1979 | U.S.S.R. | |

Primary Examiner—Andres Kashnikow
Assistant Examiner—Mark T. Le
Attorney, Agent, or Firm—Klein & Vibber

[57] ABSTRACT

A face shock absorber with a top and a bottom adapter, between which there is mounted a housing, and in it there are disposed a spindle and active elements disposed inside a chamber enclosed by a top and a bottom disk, the housing and the spindle, and underneath the bottom disk there are disposed springs. The top adapter is embraced by a two-stepped nut with external thread, screwed up to the housing, and through the two-stepped nut there pass keys. The working chamber is divided by intermediate sleeves into sections, in each of which there are disposed spherical heads, shaped in the external surface of the spindle. The active elements disposed inside the working chamber are balls. The springs are limited in their bottom end by a ring-shaped nut, and it is possible to use springs of the slotted type.

5 Claims, 1 Drawing Sheet

FACE SHOCK ABSORBER

FIELD OF THE INVENTION

The invention relates to a face shock absorber intended for the drilling of small-diameter wells, which can find application in geological prospecting.

BACKGROUND OF THE INVENTION

A known face shock absorber is disclosed in USSR Inventor's Certificate No. 697,683. The known device consists of a top adapter with a housing screwed up to it. Inside the housing there is disposed a spindle. The bottom end of the spindle ends with a bottom adapter. Inside a chamber enclosed by a top and a bottom disk, the housing and the spindle, there are disposed active elements (rings woven of small steel wires). Above the top disk, there is screwed up a limiting nut. Underneath the active elements are spiral springs. The active elements are supported by an intermediate wall which is part of the housing.

Drawbacks of this known type of shock absorber include:

the ring-shaped active elements woven of small steel wires have a low coefficient of energy conversion and a low serviceability;

there is a high loading of the spiral springs by the acting forces because of the single-section arrangement of the active elements, and this does not allow the use of the shock absorbers for multi-section drilling.

It is, therefore, a general object of this invention to develop a face shock absorber with variable characteristics of the working system in which the active elements have a high coefficient of conversion and a great duration of operation, which ensures the damping of longitudinal vibrations in a wide range.

SUMMARY OF THE INVENTION

The present invention provides a face shock absorber comprising a top and a bottom adapter, between which there is mounted a housing, and in it there are disposed a spindle and active elements disposed inside a chamber enclosed by a top and bottom disk, the housing and the spindle, and underneath the bottom disk there are disposed springs. According to the invention, the top adapter is embraced by a two-stepped nut with external thread, screwed up to the housing, and through the two-stepped nut there are passing keys. The working chamber is divided by intermediate sleeves into sections, in each of which there are disposed spherical heads, formed in the external surface of the spindle. The active elements disposed inside the working chamber, are balls. The springs are limited in their bottom end by a ring-shaped nut under which is mounted the bottom adapter, and it is possible to use springs of the slotted type.

Some advantages of the invention are that the active elements have a high coefficient of conversion and high serviceability, their replacement is effected quickly and easily, the working system has a wide range of action and there is no direct loading of the elastic elements, i.e. the slotted springs.

BRIEF DESCRIPTION OF THE DRAWING

With these and other objects in view, which will become apparent in the following detailed description, the present invention, which is shown by example only, will be clearly understood in connection with the accompanying drawing, in which.

DESCRIPTION OF THE PREFERRED EMBODIMENT

Figures 1, 2:
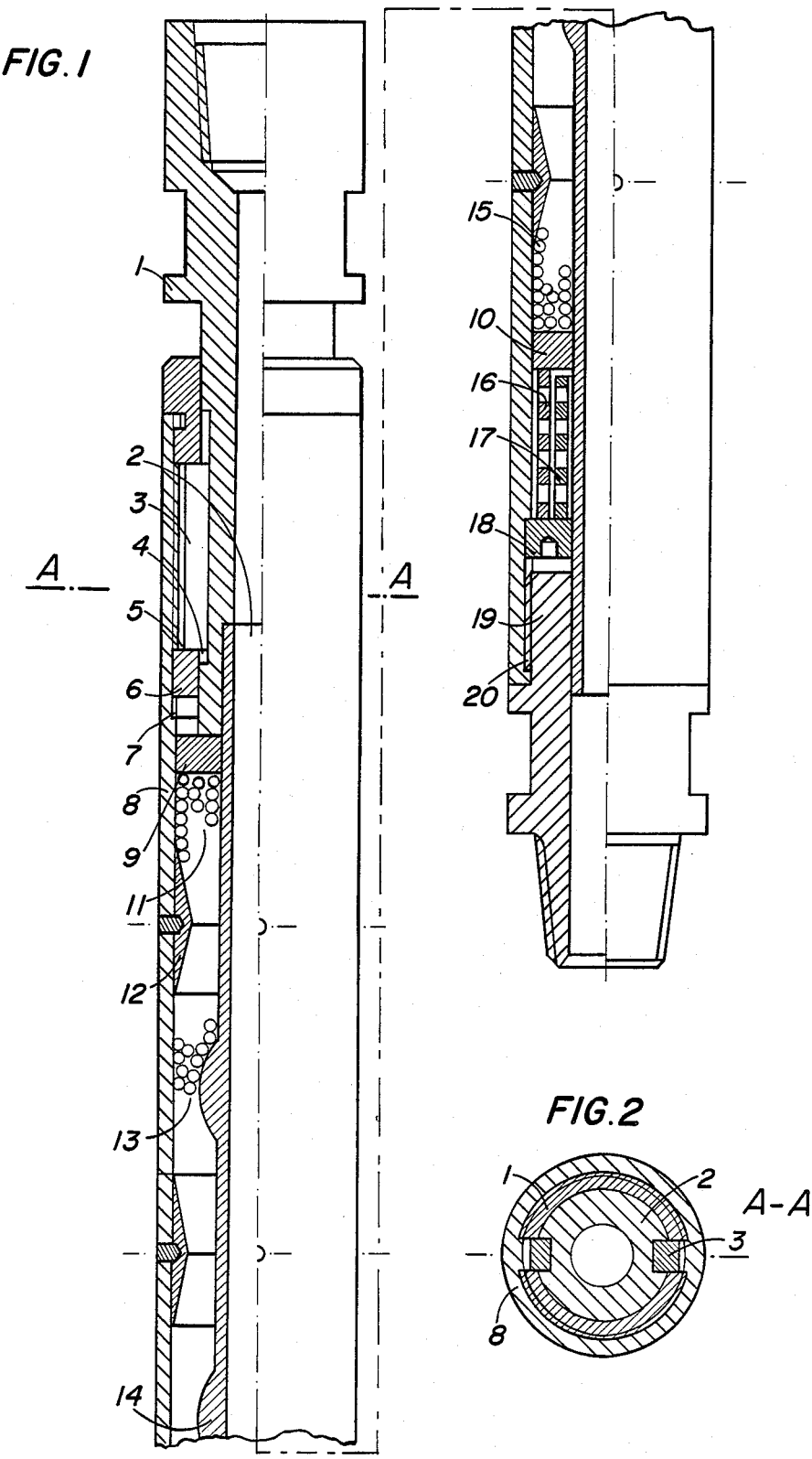
FIG. 1 is a side elevational view, partially in section showing a face shock absorber according to the invention.
FIG. 2 is a cross-section of the shock absorber of FIG. 1 along the line A—A through the two-stepped nut for transferring the moment of rotation.

The face shock absorber according to the invention comprises a top adapter 1 of cylindrical shape, and having at both ends an internal thread. The top thread is intended for connection with a drill pipe (not shown in the drawing) and the bottom thread, with a spindle 2. The external surface of the top adapter 1 is stepped, and in the lower step there are disposed the keys 3 which lie in longitudinal grooves 4.

Keys 3 enter the seats 5, formed in two-stepped nut 6 which embraces the bottom step of the top adapter 1 and is connected to sleeve 8 by means of thread 7. Between the internal wall of the sleeve 8 and the spindle 2 there is freely disposed a top disk 9, which is in contact with the bottom end of the top adapter 1. At the other end of the shock absorber, between the internal wall of the sleeve 8 and the spindle 2 there is disposed a bottom disk 10.

The internal space formed between the sleeve 8, the top disk 9, the spindle 2 and the bottom disk 10 represents the working chamber 11 of the shock absorber. It is divided by intermediate sleeves 12, which are rigidly connected to the sleeve 8 and form separate sections 13. In each section 13 there is disposed a spherical head 14 of the spindle 2. All sections are filled with active elements, balls 15.

The bottom disk 10, which represents the movable bottom of the working chamber 11, lies on concentrically arranged one-in-the-other slotted springs 16 and 17 of different length. The springs 16, 17 are limited on the bottom by a ring-shaped nut 18, underneath which there is disposed the bottom adapter 19, and both components are connected to the sleeve by means of a thread 20.

During operation, the face shock absorber transmits the axial load and the torque to the working tool and damps, at the same time, in a wide range, the longitudinal vibrations of the drill pipe which occur during drilling. The axial load is transmitted from the drill pipe by means of the top adapter 1, the top disk 9 and the spindle 2 (the spherical heads 14), to the active elements, i.e. the balls 15 which are previously pressed one against the other by the slotted springs 16 and 17. The force which compresses the balls 15 is regulated by the ring-shaped nut 18.

Depending on the size of the forces occurring during operation, the displacement of the balls is greater or smaller and, thus, together with the variation of the pressure force produced by the compression of the springs 16 and 17, there is provided a variable dynamic characteristic. At the time, as a result of the friction forces which occur during the motion of the balls 15, a considerable part of the energy of the longitudinal vibrations is converted into thermal energy. Thus, there are provided conditions for normal operation of the bit.

Although the invention is described and illustrated with reference to a singular embodiment thereof, it is to be expressly understood that it is in no way limited to the disclosure of such preferred embodiment but is capable of numerous modifications within the scope of the appended claims.

We claim:

1. A face shock absorber comprising:
   a top adapter and a bottom adapter, between said adapters there being mounted a housing;
   a spindle, disposed inside said housing and forming a space between said spindle and said housing;
   a top disk and a bottom disk, each disk being disposed around said spindle, within said space and forming a chamber, said chamber being defined by said disks, said spindle, and said housing;
   active elements disposed within said chamber;
   a pair of springs disposed beneath said bottom disk and within the space between said spindle and said housing;
   said springs being of unequal length and being substantially coaxially disposed one inside the other;
   said top adapter being embraced by a two-stepped nut, said two-stepped nut having an internal thread and an external thread and a stepped external profile, said external thread of said two stepped nut being screwed to the housing;
   a key, passing through a longitudinal keyway in said two-stepped nut;
   a plurality of intermediate sleeves mounted on said housing within said chamber, thereby separating said chamber into a plurality of sections; and
   a plurality of spherical heads formed on the surface of said spindle, each head residing within one of said sections.

2. A shock absorber as claimed in claim 1, wherein said active elements are balls and said springs are limited by a ring-shaped nut screwed to said housing.

3. A shock absorber as claimed in claim 1, wherein the springs are slotted.

4. A shock absorber as claimed in claim 2, wherein the springs are slotted.

5. A shock absorber as claimed in claim 1, wherein said active elements are balls arranged in a pack having a certain mass

* * * * *